(12) United States Patent
Meesaraganda

(10) Patent No.: US 12,476,857 B1
(45) Date of Patent: Nov. 18, 2025

(54) DIGITAL AIDED CLIPPING METHODS AND DEVICES FOR DIGITAL POWER AMPLIFIER

(71) Applicant: Morse Micro Pty. Ltd., Surry Hills (AU)

(72) Inventor: Surendra Raju Meesaraganda, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 0 days.

(21) Appl. No.: 18/774,825

(22) Filed: Jul. 16, 2024

(51) Int. Cl.
*H04L 27/26* (2006.01)

(52) U.S. Cl.
CPC ............................ *H04L 27/2623* (2013.01)

(58) Field of Classification Search
CPC .......................... H04L 27/2623; H03F 1/3241
See application file for complete search history.

(56) References Cited

U.S. PATENT DOCUMENTS 6,044,117 A * 3/2000 Muto ...................... H04L 27/36
  375/295
9,172,574 B1 * 10/2015 Zillmann ............ H04L 27/2623
2005/0195916 A1 * 9/2005 Anvari ................. H04B 1/0475
  375/295
2014/0044158 A1 * 2/2014 Raghu ................. H04L 27/3863
  375/345
2018/0091338 A1 * 3/2018 Mayer ................. H04L 27/2623

FOREIGN PATENT DOCUMENTS

WO    WO-2021087533 A2 * 5/2021 ........... H03F 1/3241

* cited by examiner

*Primary Examiner* — Freshteh N Aghdam
(74) *Attorney, Agent, or Firm* — Matthew Frontz; Polsinelli PC (57) ABSTRACT

Methods and wireless communication devices for adaptive clipping input of a Digital Power Amplifier (DPA). The wireless communication device receives a baseband sample with In-phase (I) and Quadrature-phase (Q) components and clips the baseband sample upon determining that the baseband sample satisfies a clipping condition. The clipping condition is satisfied when a sum of absolute values of the I and Q components is greater than a predefined threshold value, and after clipping, a sum of absolute values of the I and Q components becomes less than or equal to the predefined threshold value. The methods and wireless communication devices drive the DPA to generate a Radio Frequency (RF) output for wireless transmission according to the clipped baseband sample to prevent mirror image distortion.

14 Claims, 5 Drawing Sheets

DIGITAL AIDED CLIPPING METHODS AND DEVICES FOR DIGITAL POWER AMPLIFIER

FIELD OF THE INVENTION

The present disclosure generally relates to wireless communications. Specifically, aspects of the present disclosure are related to digital processing for wireless transmission.

BACKGROUND

A wireless communication system, for example, a Wireless Local Area Network (WLAN), typically includes multiple wireless communication devices such as an Access Point (AP) communicating with one or more Stations (STAs). The AP of the wireless communication system may be coupled to another network, such as the Internet, and may enable STAs to communicate bi-directionally or enable a STA to communicate with other devices in the network through the AP. Power Amplifiers (PAs) are required in Radio Frequency (RF) transceivers of wireless communication devices for receiving and transmitting wireless electromagnetic signals. Power amplifier efficiency highly influences power consumption in RF transceivers. A power amplifier with high efficiency is critical to conserve energy and extend the battery lifetime of the wireless communication device. Digital Power Amplifiers (DPAs) have seen growing interest over traditional analog PAs as a DPA can integrate functions of a Digital to Analog Converter (DAC), a frequency up-converter or a mixer, and an analog PA. Employing a DPA in an RF transceiver not only improves the energy efficiency of the RF transceiver, but also reduces the chip area required for the RF transceiver. A Switched capacitor Power amplifier (ScPa) is a type of DPAs, which uses capacitors, along with switches, to achieve a higher linearity and higher efficiency especially at a higher output power level. In-phase (I) and Quadrature-phase (Q) components of a signal are coupled through different capacitor arrays of a ScPa by using coding circuits of the ScPa to map amplitudes of the I and Q components to different capacitor arrays. The amplitudes of the I and Q components of the signal are also referred to as the in-phase (I) samples and quadrature-phase (Q) samples in this specification. Capacitors in each capacitor array may be selectively coupled to one or more reference voltages utilizing the switches to control these capacitors to be turned on or off. The amplitudes of the I and Q components are coded into amplitude codes, and used to control which capacitors in each capacitor array of the ScPa are turned on. For example, an output amplitude is modulated by selecting the number of capacitors, n, being switched between $V_{GROUND}$ and $V_{DD}$ from among the total number of capacitors, N, in the array.

SUMMARY

The following summary presents technical features relating to one or more aspects disclosed herein and should not be considered as an extensive overview relating to all contemplated aspects, nor should the following summary be considered to identify key or critical elements relating to all contemplated aspects or to delineate the scope associated with any aspect. Accordingly, the following summary has the sole purpose to present certain concepts relating to one or more embodiments relating to the digital clipping methods disclosed herein in a simplified form to precede the detailed description presented below.

Disclosed are digital clipping methods for adaptive clipping input of a Digital Power Amplifier (DPA) in a transmitter of a wireless communication device. Embodiments of the digital clipping method comprise receiving an In-phase (I) component and a Quadrature-phase (Q) component of a digital baseband sample, determining whether the digital baseband sample satisfies a clipping condition, upon the digital baseband sample satisfies the clipping condition, clipping the digital baseband sample and driving the DPA according to the digital baseband sample to generate a Radio Frequency (RF) output for wireless transmission. The I and Q components are represented by digital codes. The clipping condition is satisfied when the sum of absolute values of the I and Q components is greater than a predefined threshold value. The digital clipping method ensures the sum of absolute values of the I and Q components of the clipped baseband sample is less than or equal to the predefined threshold value.

In some embodiments, the predefined threshold value is determined depending on the number of bits of the digital code for representing the I or Q component of the baseband sample. For example, N bits are used to represent an amplitude of the digital code for the I or Q component, and the predefined threshold value is 2 to the power of N. In one specific example, 15 bits are used to represent the amplitude of the digital code for the I or Q components, and the predefined threshold value is 32768. The clipping condition is satisfied when the sum of the absolute values of I and Q components is greater than 32768.

Some embodiments of clipping the digital baseband sample comprise deriving an orthogonal projection of the digital baseband sample to a clipping rhombus. The clipping rhombus is defined as including all sample values with a sum of absolute values of I and Q components equal to the predefined threshold value. In one embodiment, clipping the digital baseband sample includes determining a quadrant for the digital baseband sample, determining a slope and an intercept according to the quadrant, and deriving a clipped sample located on the clipping rhombus based on the determined slope and intercept. For example, when a digital baseband sample (X, Y) satisfies the clipping condition, the clipped baseband sample $(X_P, Y_P)$ can be derived from the digital baseband sample (X, Y), the slope m, and the intercept c according to the following formulas. To simplify the implementation of digital baseband sample clipping, the division operation $(1+m^2)$ can be replaced by a shift operation according to some embodiments of the present invention.

$$X_p = \frac{X + mY - mc}{1 + m^2} \text{ and } Y_p = \frac{mX + m^2Y + c}{1 + m^2}.$$

In some embodiments, clipping the digital baseband sample further comprises mapping the digital baseband sample to a clipped sample according to a mapping table. The mapping table is designed to output clipped samples with a sum of absolute values of I and Q components equal to or less than the predefined threshold value to prevent mirror image distortion.

An aspect of the present invention discloses a wireless communication device wirelessly connected to a wireless communication network for transmitting an RF signal on a wireless medium. The wireless communication device comprises a transmitter, a processor, and one or more memory banks. The memory banks are communicatively coupled to the processor and storing processor readable codes that, when executed by the processor in conduction with the receiver and transmitter, is configured to adaptively perform digital clipping. The transmitter comprises a digital clipping module receiving and adaptively clipping a digital baseband sample, and a DPA coupled to the digital clipping module for generating an RF output for wireless transmission according to the digital baseband sample. The digital clipping module applies clipping on the digital baseband sample that satisfies a clipping condition, where the clipping condition is satisfied when the sum of absolute values of the I and Q components is greater than a predefined threshold value. After digital clipping, the sum of absolute values of the I and Q components of the clipped baseband sample is less than or equal to the predefined threshold value. The DPA is implemented by a Switched capacitor Power amplifier (ScPa) according to some embodiments of the present invention.

In some embodiments of the wireless communication device, a transmit upsampling module is coupled to the digital clipping module, for interpolating the baseband sample, resampling to a sub-multiple of RF, and outputting the digital baseband sample to the digital clipping module. The transmit upsampling module may comprise a mixer for translating a signal around Direct Current (DC) to a sub-band offset, and a compensator for compensating IQ (In-phase Quadrature-phase) imbalance and Local Oscillator (LO) leakage before resampling.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures.

DETAILED DESCRIPTION

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive. The following description of the embodiments will provide those skilled in the art with an enabling description for implementing an example aspect. Changes may be made in the function and arrangement of elements without departing from the spirit and scope of the application as set forth in the claims.

The performance of a Digital Power Amplifier (DPA) in an RF transceiver becomes inferior whenever an absolute value of an in-phase (I) sample and an absolute value of the corresponding quadrature-phase (Q) sample are large. By observing the experiment result, the DPA performance degrades when the sum of absolute values of I and Q components exceeds a certain threshold value. This threshold value is found to be relevant to the number of bits used to represent the in-phase and quadrature-phase samples. For example, in a 16-bit Digital to Analog Converter (DAC) used in the RF transceiver, 1 bit represents the sign, and 15 bits represent the amplitude, each of the in-phase and quadrature-phase samples is represented by an amplitude code which is 15 bits long. The threshold value for preventing the performance degradation is 2 to the power of 15 (i.e. $2^{15}$=32768), that is, the performance of the DPA degrades when $|I|+|Q|>32768$, where I represents the sample on the in-phase path and Q represents the sample on the quadrature-phase path. This performance degradation is due to a bad mirror behavior exhibited by the DPA when the sum of the absolute value of I and the absolute value of Q exceeds the threshold value. Experiments show the transmit signal constellation has most of the IQ samples satisfying the condition of $|I|+|Q|\le 32768$, or within the locus of $|I|+|Q|=32768$. However, by observing the IQ constellation, there is a mirror effect resulting from an ScPa on the IQ samples with a sum of the absolute I and Q values exceeds the threshold value, i.e. $|I|+|Q|>32768$. Specifically, for those IQ samples outside the locus of $|I|+|Q|=32768$, the ScPa almost creates mirror images of the original IQ samples along the $|I|+|Q|=32768$ rhombus. These mirror images distort the spectrum to a great extent at higher powers. In the following description, a sample with a sum of absolute I and Q values exceeds the threshold value, e.g. a sample outside of the $|I|+|Q|=32768$ rhombus, is referred to as a sample satisfying a clipping condition, and the rhombus defining the clipping condition is referred to as a clipping rhombus. The threshold value is determined and used to compare with each digital baseband sample to determine which digital baseband samples may cause mirror image distortion in the DPA. Various embodiments of the present invention may set the threshold value according to the bitwidth of the DAC or the number of bits used to represent the amplitude of the I/Q samples.

To alleviate this mirror image distortion problem, embodiments of the digital clipping method adaptively clip elegantly in the digital baseband domain rather than in the DPA module. There are a number of ways to clip or map a digital baseband sample satisfying the clipping condition to ensure the new sample is located within the clipping rhombus or on the clipping rhombus. For example, a clipping operation is performed on each digital baseband sample with I and Q components represented by 15-bits digital codes that is outside the $|I|+|Q|=32768$ rhombus. Embodiments of the present invention clip digital baseband samples satisfying the clipping condition to reduce the distortion mainly caused by the mirror imaging behavior of the DPA.

Figure 1:
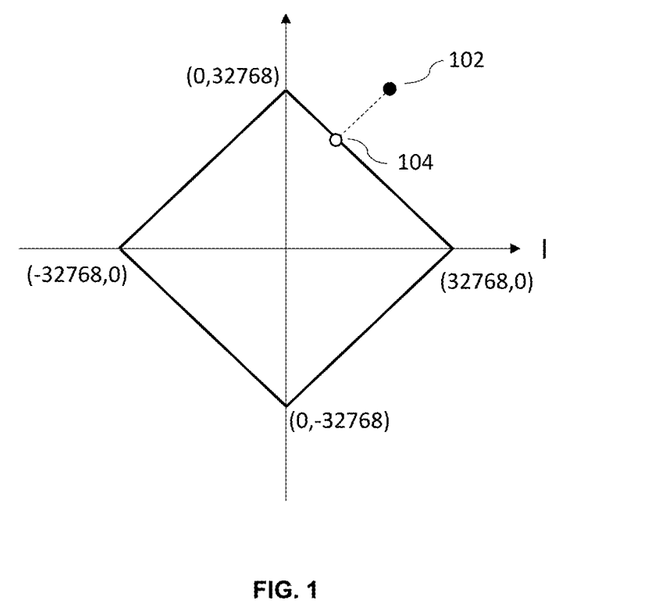
FIG. 1 illustrates a clipping method which maps an original digital baseband sample outside of the clipping rhombus to a new position on the clipping rhombus by orthogonal projection according to an embodiment of the present invention.
Figure 2:
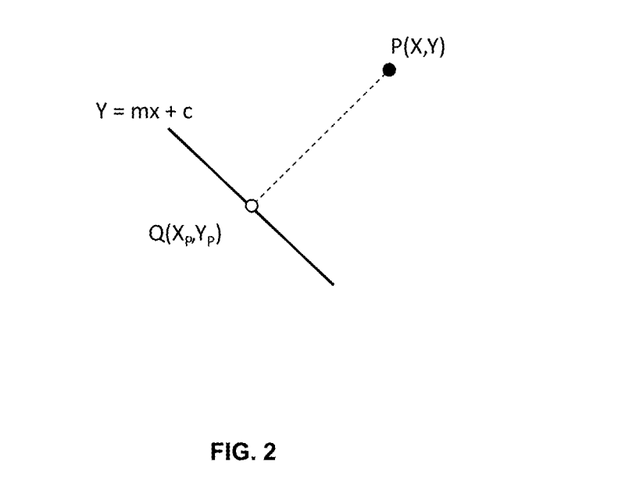
FIG. 2 demonstrates a method of deriving an orthogonal projection position of a point P with a coordinate (X,Y) according to an embodiment of the present invention.

In one preferred embodiment, the digital clipping method for digital baseband samples satisfying the clipping condition minimizes the mean squared error by deriving an orthogonal projection of an original sample to the clipping rhombus. FIG. 1 shows a clipping method which maps an original sample 102 outside of the clipping rhombus to a new sample 104 on the clipping rhombus by orthogonal projection. An orthogonal projection of the original sample P with a coordinate (X,Y) onto a line y defined by a slope-intercept relationship, y=mx+c, where m and c are slope and intercept respectively, is shown in FIG. 2. The projected sample Q on the line has a coordinate (Xp, Yp). Since the product of slopes of two perpendicular lines is −1, the slope of the line PQ is −1/m.

$$\frac{Y - Y_p}{X - X_p} = -\frac{1}{m} \Rightarrow X_p + mY_p = X + mY;$$ Equation (1)

Since point Q lies on the line defined by y=mx+c, it is true that $Y_p = mX_p + c$. By substituting the value of $Y_p$ in Equation (1), the coordinate of the projected sample Q can be represented as:

$$X_p = \frac{X + mY - mc}{1 + m^2}; \text{ and } Y_p = \frac{mX + m^2Y + c}{1 + m^2}.$$ Equation (2)

By projecting the digital baseband sample that satisfies the clipping condition (e.g. |I|+|Q|>32768) onto the clipping rhombus (e.g. |I|+|Q|=32768), the mean-square errors between the original baseband sample and the clipped baseband sample can be minimized. When these clipped baseband samples are passed through the DPA, the DPA by itself will not introduce any mirror image distortion since these baseband samples input to the DPA are now constrained to be within the clipping rhombus. According to embodiments of the present invention, the digitally clipping IQ samples will replace the original IQ samples satisfying the clipping condition (i.e. |I|+|Q|>32768 in this example) to prevent the DPA introduce mirror imaging distortion. The digital clipping method clips the digital baseband samples satisfying the clipping condition using orthogonal projection to prevent DPA degradation.

In an embodiment of the digital clipping method, a first step is to check if any digital complex baseband sample satisfies a clipping condition, for example, the clipping condition is satisfied when a sum of absolute values of I and Q samples is greater than a predefined threshold value. In some embodiments of using a predefined threshold value to determine whether a digital complex baseband sample satisfies the clipping condition, the predefined threshold value is determined depending on a number of bits used to represent the I and Q samples. For each digital complex baseband sample satisfying the clipping condition, an embodiment of the digital clipping method determines a quadrant the sample belongs to. Quadrant information is important as it specifies the lines to which the sample will be orthogonally projected to. Based on the quadrant information, the corresponding slope m and intercept c are determined for the sample. For example, the slope m=−1 and the intercept c=32768 if the sample is in the first quadrant, the slope m=1 and the intercept c=32768 if the sample is in the second quadrant, the slope m=−1 and the intercept c=−32768 if the sample is in the third quadrant, and the slope m=1 and the intercept c=−32768 if the sample is in the fourth quadrant. The clipped sample coordinate $(X_p, Y_p)$ is then derived from the original coordinate (X, Y) and the corresponding slope and intercept. For example, a sample (X, Y) in the second quadrant is clipped to a clipped sample coordinate $(X_p, Y_p)$ by substituting m=1 and c=32768 into Equation (2). The clipped samples replacing the samples satisfying the clipping condition are used to input to the DPA, such as the ScPa, to prevent mirror image distortion.

Figure 3:
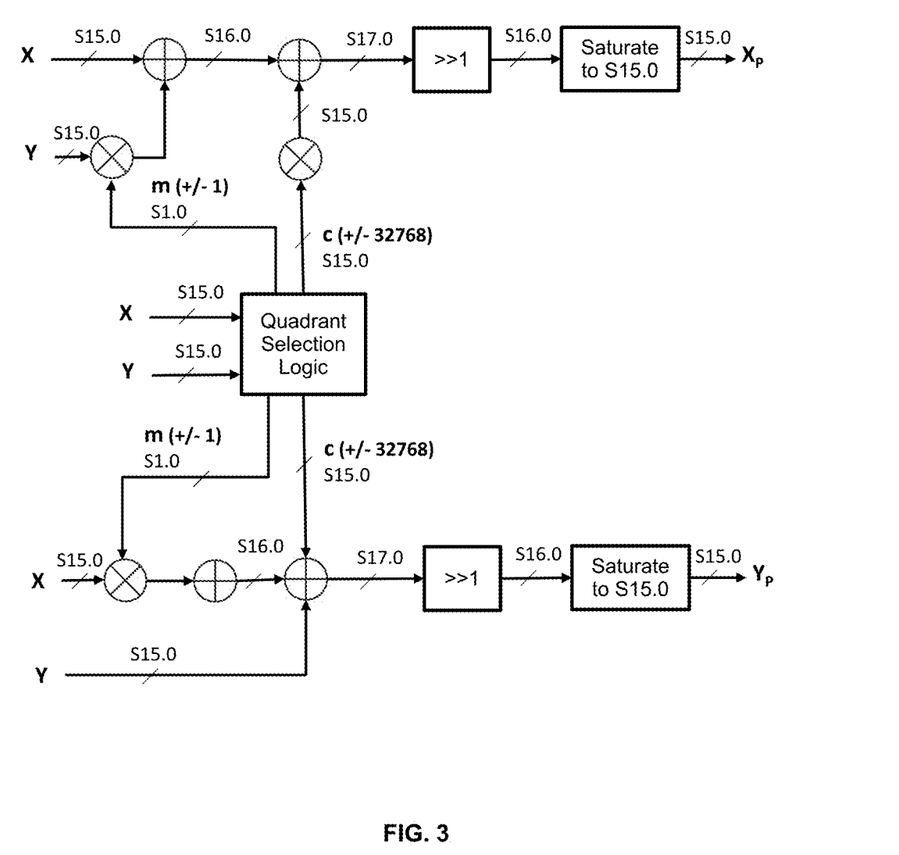
FIG. 3 illustrates an embodiment of a fixed-point implementation for the clipping method using orthogonal projection according to an embodiment of the present invention.

FIG. 3 illustrates an overall fixed-point implementation for digital clipping using orthogonal projection according to an embodiment of the present invention. In this embodiment, a clipped sample $(X_p, Y_p)$ is derived from a digital baseband sample (X, Y) by selecting a quadrant and determining a corresponding slope m and a corresponding intercept c. The inputs X and Y of digital clipping are 15-bits I and Q components of each digital baseband sample, which are also the X and Y shown in Equation (2). In this embodiment, each I or Q component is represented by a signed 15 bits (S15.0), and each I or Q component of the output clipped sample is also represented by a signed 15 bits. A quadrant selection logic is used to compute the slope m and the intercept c for calculating the clipped sample, where the slope m is either +1 or −1, and the intercept c is either 32768 or −32768. All the clipped samples $(X_p, Y_p)$ will be located on the clipping rhombus in this embodiment. Since the values of the slope m are 1 or −1, the denominator $1+m^2$ in the expressions for $X_p$ and $Y_p$ as shown in Equation (2) is 2, the division operation in digital clipping can be implemented as a simple shift operation.

In some other embodiments of the digital clipping method, the digital baseband sample outside the clipping rhombus can be clipped to a new location that is within the clipping rhombus. In one embodiment, the fixed-point implementation for digital clipping as shown in FIG. 3 can be used to achieve deriving a clipped sample within the clipping rhombus, for example, by changing the absolute value of the intercept from 32768 to a value slightly less than 32768. The clipped sample derived from this embodiment is also an orthogonal projection of the original digital baseband sample with respect to the clipping rhombus, but rather than on the clipping rhombus, the clipped sample is within the clipping rhombus. In some embodiments, a mapping table is used to map each digital baseband sample outside the clipping rhombus to a clipped sample within the clipping rhombus or on the clipping rhombus. The clipped sample derived by the mapping table can also be an orthogonal projection on the clipping rhombus or within the clipping rhombus. In some other embodiments, the clipped sample derived by the mapping table is not an orthogonal projection of the original digital baseband sample. In one embodiment, the clipped sample is selected from a number of predefined cartesian coordinates depending on the original digital baseband sample, where the predefined cartesian coordinates are located on the clipping rhombus or within the clipping rhombus. For example, a clipping sample is one of eight predefined cartesian coordinates (0, 32768), (16384, 16384), (32768, 0), (16384, −16384), (0, −32768), (−16384, −16384), (−32768, 0), and (−16384, 16384). By applying this embodiment to the original sample 102 as shown in FIG. 1, the original sample 102 outside the clipping rhombus is clipped to the closest predefined cartesian coordinate (16384, 16384).

Figure 4:
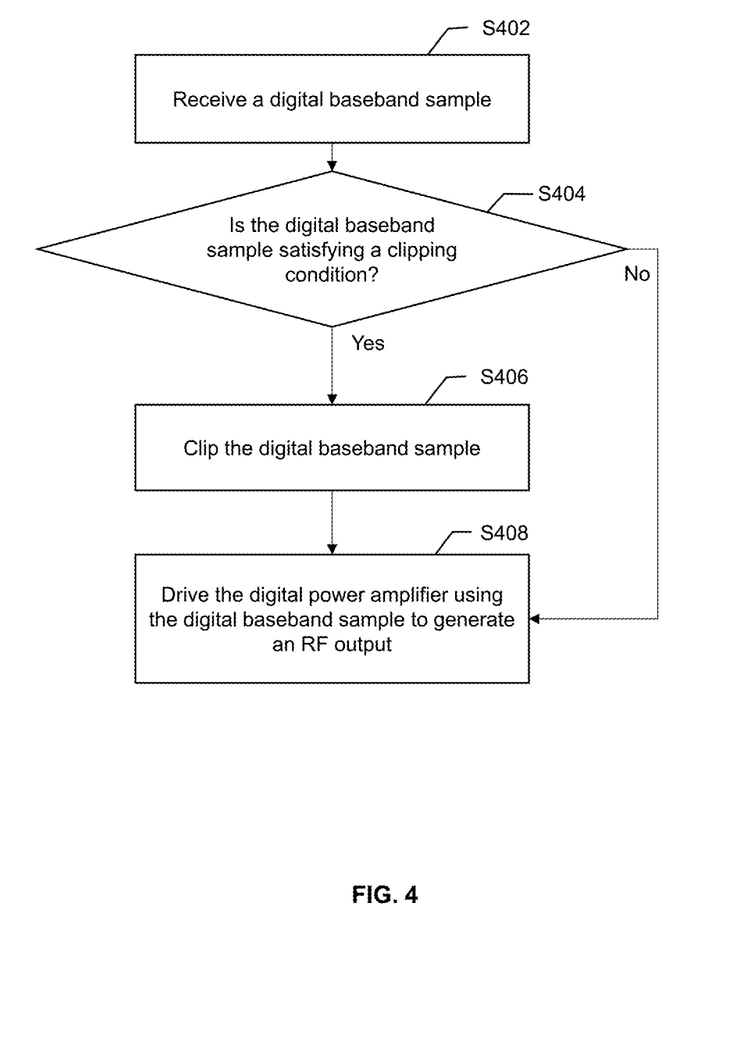
FIG. 4 is a flowchart illustrating a digital clipping method for adaptive clipping input of a digital power amplifier according to an embodiment of the present invention.

FIG. 4 is a flowchart demonstrating an example of the digital clapping method for adaptive clipping input of a DPA. A digital baseband sample is received in step S402, and this digital baseband sample is evaluated to determine whether it satisfies a clipping condition in step S404. If the digital baseband sample satisfies the clipping condition, it is clipped according to an embodiment of the present invention in step S406. In step S408, the digital baseband sample, either clipped or unclipped depending on whether it satisfies the clipping condition, is used to drive the DPA to generate an RF output. The digital baseband sample has an in-phase (I) component and a quadrature-phase (Q) component, and each component is represented by a digital code. Embodiments of the clipping condition are associated with a sum of absolute values of the I and Q components, where the digital baseband sample satisfies the clipping condition when the sum of the absolute values is greater than a predefined threshold value. In some embodiments, the digital baseband sample is clipped to ensure the sum of the absolute values of I and Q components is less than or equal to the predefined threshold value. For example, the sum of the absolute values of the I and Q components of the clipped sample is equal to the predefined threshold value.

Figure 5:
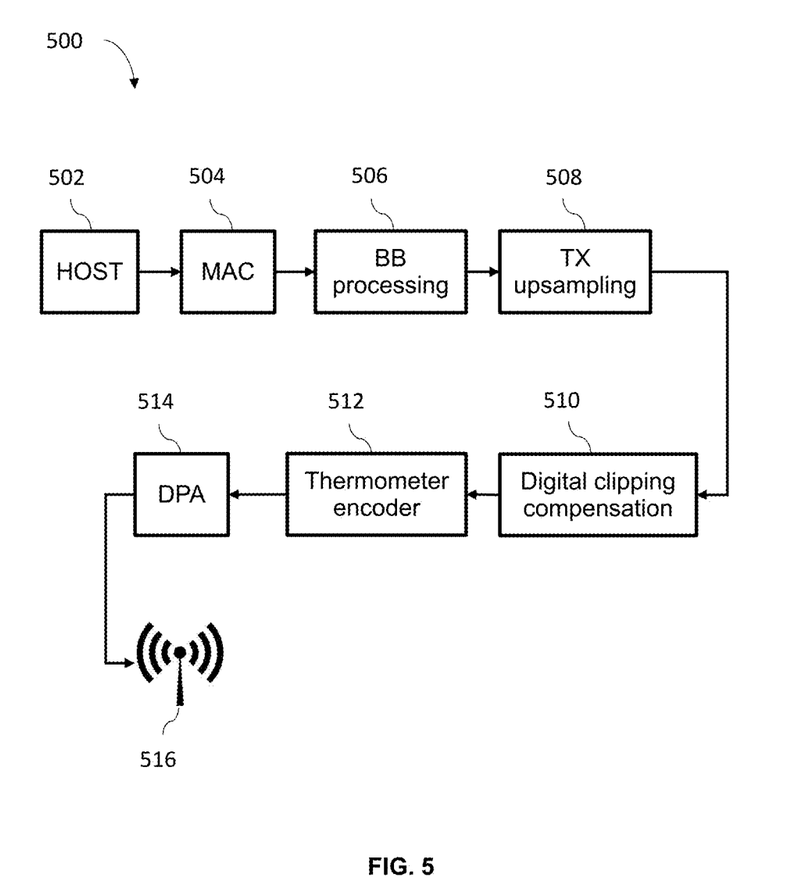
FIG. 5 is a flowchart illustrating simplified schematic block diagram of a transmitter data flow architecture in accordance with an embodiment of the present invention.

FIG. 5 is a simplified schematic block diagram of a transmitter data flow architecture 500 used for transmitting radio signals over the wireless medium in accordance with an embodiment of the present invention. Data is generated from a HOST module 502 and packaged in a Medium Access Control (MAC) level Protocol Data Unit (MPDU) to be routed over the wireless network by a MAC management module 504. A Baseband (BB) processing module 506 compiles a Physical (PHY) level Protocol Data Unit (PPDU) by adding a PHY preamble and tail to the MPDU. Usually a Modulation Coding Scheme (MCS) for transmission of the packet over the wireless medium is established using a rate control algorithm by the MAC module 504 or BB processing module 506. The modulation scheme selected defines the modulation technique and the coding rate to be used to encode and transmit the data on the wireless medium. In some examples, the BB processing module 506 performs differential encoding followed by modulation, followed by waveform shaping and resampling. The baseband samples output from the BB processing module 506 are then sent to a transmit upsampling module 508. The transmit upsampling module 508 interpolates the baseband samples from Nyquist or twice Nyquist to Digital to Analog Converter (DAC) operational frequency which is typically the RF frequency. The transmit upsampling module 508 may contain multiple stages of interpolation. For example, baseband samples are generated using an Inverse Fast Fourier Transform, and a spectrum shaping filter is used to further attenuate the sidelobes. The spectrum shaping filter has been made programmable to optimize filters for different bandwidths. A series of filters that further interpolates the digital baseband samples. An optional mixer translates the signal centered around DC to any required sub-band offset. Some examples of transmit upsampling module 508 include transmit IQ imbalance and Local Oscillator (LO) leakage compensation after the mixer, and a resampler resamples to a sub-multiple of the RF frequency. A digital clipping compensation module 510 adaptively clips the output of the transmit upsampling modules 508 in accordance with an embodiment of the digital clipping method. The digital clipping compensation module 510 clips the baseband sample that satisfies a clipping condition, for example, the clipping condition is associated with the sum of absolute values of I and Q. The output of the digital clipping compensation module 510 is then sent to a thermosmeter encoder 512 before driving a Digital Power Amplifier (DPA) 514. The DPA 514 embeds the functionality of an up-conversion mixer and a DAC in the Power Amplifier (PA). The DPA 514 directly interfaces with digital signals while outputting RF signals to a transmitting antenna 516.

Figure 6:
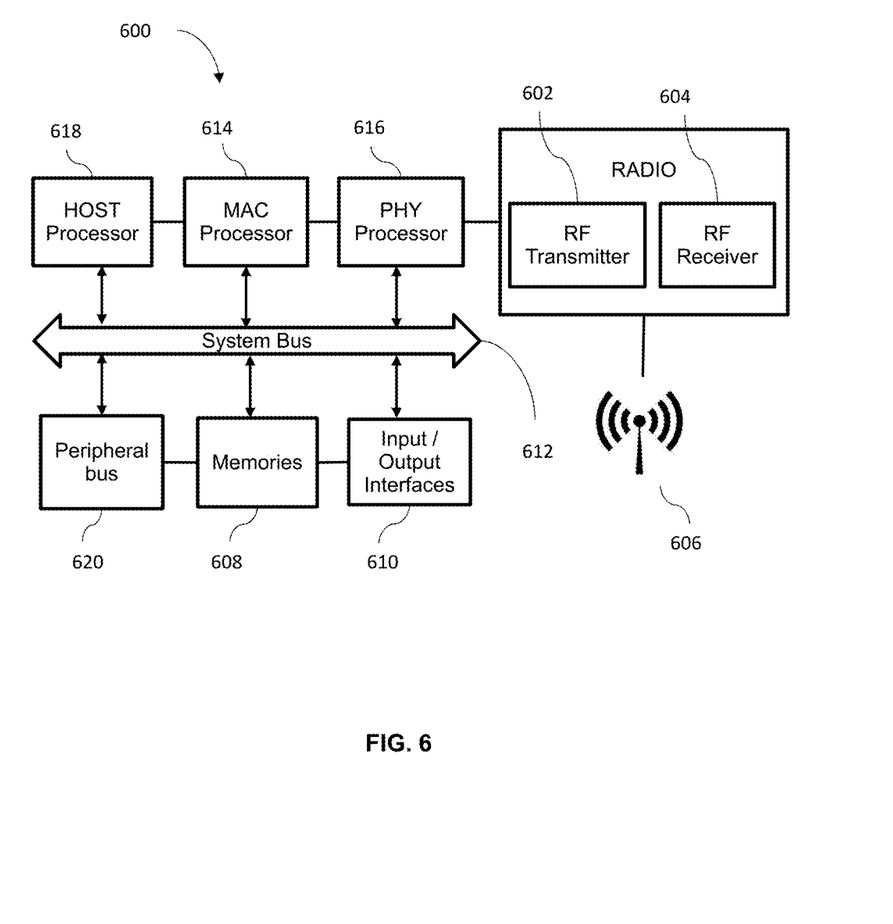
FIG. 6 illustrates a schematic block diagram of a wireless communication device for implementing an embodiment of the present invention.

FIG. 6 shows a high-level block diagram of a wireless communication device 600 that can be used to implement embodiments of the present invention. Embodiments of the wireless communication device 600 manage a MAC layer and a PHY layer in compliance with an IEEE 802.11 standard. The wireless communication device 600 can be a Station (STA) or an Access Point (AP) of a wireless network. For example, the wireless communication device 600 can be implemented in a mobile device, a personal computer, a laptop computer, an Internet of Things (IoT) device, a wearable device, an extended reality device, a video server, a camera, or a communication device on a vehicle. The wireless communication device 600 includes an RF transmitter module 602, an RF receiver module 604, an antenna unit 606, one or more memory banks 608, input and output interfaces 610 and communication bus 612. The RF transmitter module 602 and the RF receiver module 604 are also known as an RF transceiver, or a modem (modulator-demodulator), which transmits frames by modulating one or more carrier wave signals to encoded digital information, as well as receives frames by demodulating the signal to recreate the original digital information. Furthermore, the wireless communication device 600 includes a MAC processor 614, a PHY processor 616, and a HOST processor 618. These processors can be any type of Integrated Circuit (IC) including a General Processing Unit (GPU), an Application Specific Integrated Circuit (ASIC) or Reduced Instruction Set Computer—Five (RISC-V) based ICs, amongst others. Memory banks 608 store software for the processors of the wireless communication device 600. Each processor executes software to implement the functions of the respective communication/application layer. The PHY processor 616, in particular, includes a transmitting signal processing unit and a receiving signal processing unit and manages the interface with the wireless medium. The PHY processor 616 operates on PPDUs by exchanging digital samples with the radio module which comprises the RF transmitter 602, Digital-to-Analog Converters (DACs), the RF receiver 604, Analog-to-Digital Converters (ADCs) and digital filters. The MAC processor 614 executes MAC level instructions and manages the interface between the application software and the wireless medium, through the PHY processor 616. The MAC processor 614 is responsible for coordinating access to the wireless medium so that the AP and STAs in range can communicate effectively. The MAC processor 614 adds header and tail bytes to units of data provided by the higher levels and sends them to the PHY layer for transmission. The reverse happens when receiving data from the PHY layer. If a wireless frame is received in error, the MAC processor 614 manages the retransmission of the wireless frame. The HOST processor 618 interfaces with the MAC layer and is responsible for running high level functionalities of the wireless communication device 600. The RF transmitter 602 includes a digital clipping module and a DPA, and an embodiments of the digital clipping method can be implemented in the digital clipping module to prevent mirror image distortion.

The peripheral bus 620 connects to a number of peripherals that support core functions of the wireless communication device 600, including timers, interrupts, radio/filters/system registers, counters, Universal Asynchronous Receiver-Transmitter (UART) and General Purpose Input Output (GPIO) interfaces and others. The PHY processor 616, the MAC processor 614, the HOST processor 618, the peripheral bus 620, memory banks 608 and input/output interfaces 610, communicate with each other via the system bus 612. Memory banks 608 may further store an operating system and applications. In some embodiments, memory banks 608 may store recorded information about captured frames and packets. The input/output interface unit 610 allows for the exchange of information with a user. The antenna unit 606 may include a single antenna or multiple antennas.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims. Well-known circuits, processes, algorithms, structures, and techniques may be shown without unnecessary detail to avoid obscuring the aspects.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks may be stored in a computer-readable or machine-readable medium. The computer-readable medium may comprise memory or data storage media, such as Random-Access Memory (RAM) such as Synchronous Dynamic Random-Access Memory (SDRAM), Read-Only Memory (ROM), Non-Volatile Random-Access Memory (NVRAM), Electrically Erasable Programmable Read-Only Memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves. The program code may be executed by a processor, which may include one or more processors, such as one or more Digital Signal Processors (DSPs), general purpose microprocessors, an Application Specific Integrated Circuits (ASICs), Field Programmable Logic Arrays (FPGAs), or other equivalent integrated or discrete logic circuitry. Such a processor may be configured to perform any of the steps described in this disclosure. A general-purpose processor may be a microprocessor; alternatively, the processor may be any conventional processor, controller, microcontroller, or state machine. A processor may also be implemented as a combination of computing devices.

To clearly illustrate the interchangeability of hardware and software, various illustrative components, blocks, modules, engines, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present application.

What is claimed is:

1. A digital clipping method for adaptive clipping input of a Digital Power Amplifier (DPA) in a wireless communication device, the method comprising:
   receiving an In-phase (I) component and a Quadrature-phase (Q) component of a baseband sample, wherein the I and Q components are represented by digital codes;
   determining whether the baseband sample satisfies a clipping condition, wherein the clipping condition is satisfied when a sum of absolute values of the I and Q components is greater than a predefined threshold value, and wherein the predefined threshold value is determined depending on a number of bits of the digital code for representing the I or Q component of the baseband sample;
   upon the baseband sample satisfies the clipping condition, clipping the baseband sample and thereby a sum of absolute values of the I and Q components of the clipped baseband sample is less than or equal to the predefined threshold value; and
   driving the DPA according to the baseband sample to generate a Radio Frequency (RF) output for wireless transmission.

2. The digital clipping method of claim 1, wherein N bits are used to represent an amplitude of the digital code for the I or Q component, and the predefined threshold value is 2 to the power of N.

3. The digital clipping method of claim 2, wherein 15 bits are used to represent the amplitude of the digital code for the I or Q component, and the predefined threshold value is 32768.

4. The digital clipping method of claim 3, wherein the clipping condition is satisfied when |I|+|Q|>32768.

5. The digital clipping method of claim 1, wherein clipping the baseband sample further comprises deriving an orthogonal projection of the baseband sample to a clipping rhombus, wherein a sum of absolute values of I and Q components of each value on the clipping rhombus is equal to the predefined threshold value.

6. The digital clipping method of claim 5, wherein clipping the baseband sample further comprises:
   determining a quadrant the baseband sample belongs to;
   determining a slope and an intercept corresponding to the quadrant; and
   deriving a clipped sample on the clipping rhombus based on the determined slope and intercept.

7. The digital clipping method of claim 6, wherein the clipped baseband sample $(X_p, Y_p)$ is derived from the baseband sample $(X, Y)$ that satisfy the clipping condition, the slope (m), and the intercept (c) by:

$$X_p = \frac{X + mY - mc}{1 + m^2} \text{ and } Y_p = \frac{mX + m^2Y + c}{1 + m^2}.$$

8. The digital clipping method of claim 7, wherein the division operation for deriving the clipped baseband sample is implemented by a shift operation.

9. The digital clipping method of claim 1, wherein clipping the baseband sample further comprises mapping the baseband sample to a clipped sample according to a mapping table, wherein a sum of absolute values of I and Q components of the clipped sample is equal to or less than the predefined threshold value.

10. The digital clipping method of claim 1, wherein clipping the baseband sample further comprises deriving an orthogonal projection on the baseband sample within a clipping rhombus, wherein a sum of absolute values of I and Q components of each value within the clipping rhombus is less than the predefined threshold value.

11. A wireless communication device transmitting Radio Frequency (RF) signal on a wireless medium, comprising:
a processor;
one or more memory banks, communicatively coupled to the processor and storing processor readable codes that, when executed by the processor, is configured to perform digital clipping; and
a transmitter, comprising:
a digital clipping module, receiving a baseband sample with an In-phase (I) component and a Quadrature-phase (Q) component, determining whether the baseband sample satisfies a clipping condition, and clipping the baseband sample that satisfies the clipping condition, wherein the clipping condition is satisfied when a sum of absolute values of the I and Q components is greater than a predefined threshold value wherein the predefined threshold value is determined depending on a number of bits of respective digital code for representing the I or Q components of the baseband sample, and a sum of absolute values of the I and Q components of the clipped baseband sample is less than or equal to the predefined threshold value; and
a Digital Power Amplifier (DPA) coupled to the digital clipping module,
generating an RF output for wireless transmission according to the baseband sample.

12. The wireless communication device of claim 11, wherein the DPA comprises a Switched capacitor Power Amplifier (ScPa).

13. The wireless communication device of claim 11, further comprised of a transmit upsampling module for interpolating the baseband sample, resampling to a sub-multiple of RF, and outputting the baseband sample to the digital clipping module.

14. The wireless communication device of claim 13, wherein the transmit upsampling module further comprises a mixer for translating a signal around DC to a sub-band offset, and a compensator for compensating transmit IQ imbalance and Local Oscillator (LO) leakage before resampling.

* * * * *